United States Patent [19]

Radcliffe, Jr.

[11] 3,739,355

[45] June 12, 1973

[54] SENSE AMPLIFIER FOR HIGH SPEED MEMORY

[75] Inventor: Arthur J. Radcliffe, Jr., Plymouth, Mich.

[73] Assignee: Burroughs Corporation, Detroit, Mich.

[22] Filed: May 28, 1971

[21] Appl. No.: 147,894

[52] U.S. Cl. 340/173 R, 340/174 TL, 340/174 DC, 307/263, 307/238

[51] Int. Cl. .......................... G11c 7/02, C11c 11/40

[58] Field of Search ............. 340/174 DA, 174 DC, 340/174 TL, 173 R; 307/238, 246, 266, 263; 330/35; 320/1

[56] References Cited

UNITED STATES PATENTS

| | | | |
|---|---|---|---|
| 3,096,510 | 7/1963 | Lee | 340/174 DA |
| 3,484,764 | 12/1969 | Finch et al. | 340/174 DC |
| 3,495,223 | 2/1970 | Martin, Jr. | 340/174 DC |

OTHER PUBLICATIONS

IEEE Transactions On Magnetics "Common Mode Capacitive Cross Coupling in Memory Arrays" by Leilich et al., Vol. Mag. 3, No. 3, 9/67, P–495–500, 340–174 DC.

"Pulse & Digital Circuits" by Millman et al., McGraw-Hill Inc., 1956, P–28–33.

*Primary Examiner*—Stanley M. Urynowicz, Jr.

*Attorney*—Kenneth L. Miller and Edwin W. Uren

[57] ABSTRACT

A sense amplifier for use in the interrogation of a phototransistor matrix employs an electronically controlled impedance in parallel with the load resistor of each column. The electronically controlled impedance substantially reduces the time constant of electrical noise resulting from row selection. Additionally, a balancing capacitor functions to cancel the transient which results from the switching of the controlled impedance.

14 Claims, 13 Drawing Figures

INVENTOR.
ARTHUR J. RADCLIFFE, JR.
BY Russell C. Wells
ATTORNEY

SENSE AMPLIFIER FOR HIGH SPEED MEMORY

BACKGROUND OF THE INVENTION

1. Field of Invention

This invention relates in general to information storage arrays and in particular to the sense amplifiers for interrogating each cell in the array.

2. Description of the Prior Art

Prior art sense emplifiers have been difficult to apply to sensor arrays as employed in photographic memory systems due to the extremely small output current from a single sensor cell. The stray capacitance between the select or row line and the sense or column line may be on the order of a few picofarads and the sense load resistor may be on the order of 100,000, ohms, due to the aforementioned low current output. This combination, which is in an electrical series circuit when the array is addressed, combines to form an extremely long time constant relative to the operating speed capability of the remainder of the system. At the time of selection, the charge build up on the stray capacitance generates a transient voltage on the output line. This transient must fall to a value substantially below the output voltage of the cell before the cell can be interrogated successfully.

It is a principal object of this invention to reduce the transient signal effect in a sense amplifier due to the stray capacitance between a select and sense line of a memory sensor array when a select line is energized.

It is another object of this invention to cancel out any transient electrical signals generated in a sense amplifier when the transient shorting switch is activated.

It is still another object of this invention to provide an electronically controlled sense-load impedance in electrical parallel circuit with a fixed sense-load impedance to increase the operating speed of a phototransistor memory sensor array.

These and other objects will become apparent from the following drawings and description of the sense amplifier for a phototransistor memory sensor array.

SUMMARY OF THE INVENTION

A high speed memory system having an array of binary information interrogation cells such, as may be used in light energy activated memory systems. Each cell of the array is addressed by a row or select electrode and accessed via a sense or column electrode. These electrodes are coupled to each other by stray electrical capacitance. The output of a particular cell is selected by applying a potential to its select electrode and detecting an electrical signal across its sense impedance from the current emitted in the cell. An electronically controlled impedance is in electrical parallel circuit with the sense impedance for reducing the transient effect due to the stray capacitance between the select and sense electrodes. The electronically controlled impedance can be a dual-gate field-effect transistor that is activated when the array is addressed to temporarily reduce the value of the sense impedance. A balancing capacitor is used to negate the turn-off transient coupled through the drain-gate capacitance of the electronically controlled impedance.

DETAILED DESCRIPTION

Figure 1:
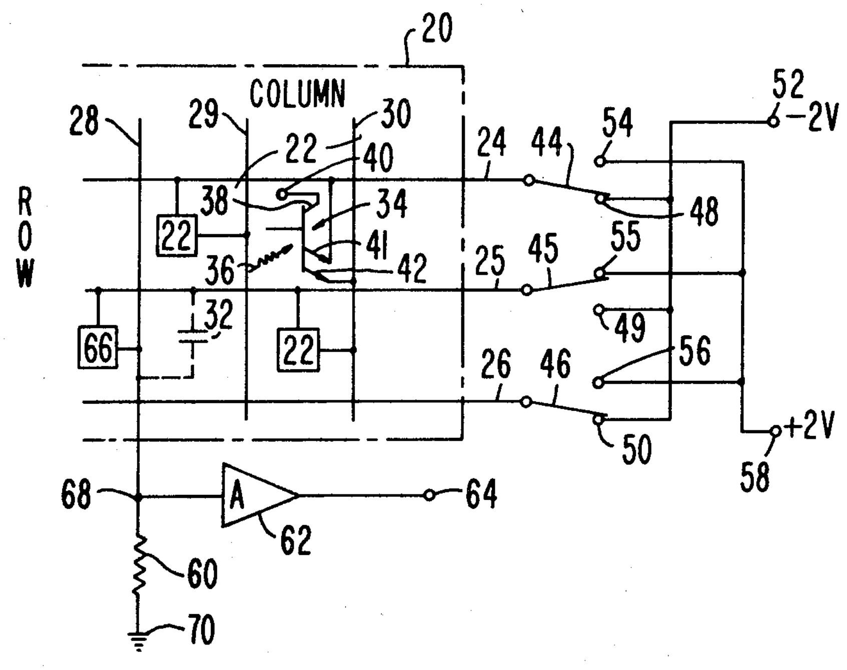
FIG. 1 is a schematic of a prior art memory array sense amplifier system.

Referring to the Figures by the characters of reference, there is illustrated in FIG. 1 a partial schematic of a portion of prior art memory system. The memory sensor array 20 is comprised of a rectangular array of binary information cells 22. Each cell is addressed by one of a plurality of select or row electrodes 24–26 intersecting with a plurality of sense or column electrodes 28–30. The capacitor 32 represents the stray electrical capacitance that is present between select electrodes and sense electrodes. This capacitance is a function of construction of the memory array including the interelectrode capacitance and the stored charge of the cell and must be considered in the addressing of a cell 22. The select electrodes 24–26 may be considered as the energizing conductors and the sense or column electrodes 28–30 may be considered as a responding conductor.

A typical construction of a cell such as may be found in a photographic memory system sensor array is illustrated in FIG. 1. The cell comprises a light activated transistor 34 wherein the base electrode 36 is biased by the radiant energy of a wave length to which the transistor is sensitive falling thereon. The collector electrode 38 is electrically connected to the substrate 40 of the array. As illustrated, the transistor has two emitters 41–42 wherein one emitter 41 is electrically connected to a row electrode, e.g. 24, and the second emitter 42 is electrically connected to a column electrode e.g., 30.

Electrically connected to each of the select or energizing conductors is a selection means such as the switches 44–46 which, as illustrated in FIG. 1, may be single-pole double-throw switches. The normally closed side 48–50 of each switch 44–46 is electrically connected to a non-energizing source of voltage 52 which in the preferred embodiment is a minus two volts. The normally opened side 54–56 of each switch 44–46 is electrically connected to an energizing voltage source 58 which in the preferred embodiment is a plus two volts.

Electrically connected in series circuit with each of the sense or responding electrodes 28–30 is an impedance means 60 responsive to any current emitted by the selected cell 22 for developing an electrical signal. The electrical signal developed across the impedance means 60 is typically of an extremely small amplitude and therefore the signal must be amplified in the amplifier 62. The amplifier which is any well known high gain amplifier develops an output signal at the output terminal 64 which may be effectively used by the overall system which contains the memory sensor array.

Figure 2:
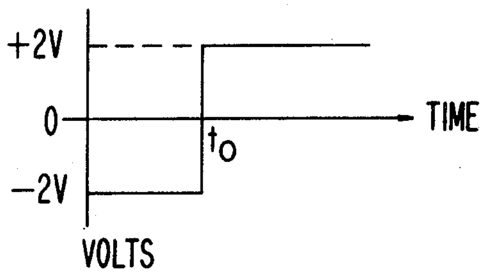
FIG. 2 is a voltage wave form illustrating the activation of one of the switches of FIG. 1.
Figure 3:
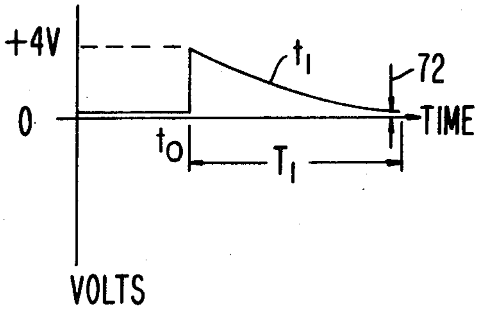
FIG. 3 is a voltage wave form illustrating the output voltage of the array of FIG. 1 due to interelectrode capacitance.

Referring to the wave shapes of FIGS. 2 and 3 in conjunction with the circuit of FIG. 1, there is illustrated in FIG. 2 the voltage applied to one select electrode 25 when the selection means 45 is transferred from the normally closed terminal 49 to the normally opened terminal 55. As illustrated in FIG. 2 and assuming instantaneous transfer, the voltage on the switch member 45 changes from a minus two to a plus 2 volts at time $t_O$. This is illustrated by the rectangular wave shape shown in FIG. 2 If, for the purposes of illustration, the information to be retrieved from the memory sensor array is stored in the particular cell 66 then the wave shape of FIG. 3 illustrates the voltage at the junction 68 of sense column 28, impedance means 60 and amplifier 62. When that cell 66 is initially selected, the interelectrode or stray capacitance 32 is charged by current flowing from the electrical ground 70 through the impedance means 60, the capacitor 32 then through the switch 45 to the plus two volt supply 58. This charging current is represented in FIG. 3 by the voltage appearing at the junction 68.

As illustrated in FIG. 3, when the switch is transferred at $t_O$, the voltage at the junction 68 rises from essentially zero potential to plus four volts. As the capacitor 32 begins to charge, the voltage at the junction 68 begins the slow exponential return to ground potential. The time constant $t_1$ of this circuit is equal to the resistance value of the impedance 60 times the capacitance value of the capacitor 32. Since the normal current output of a cell 22 and in particular cell 66, is very small, a period of time $T_1$ is required for the voltage at junction 68, due to the charging of the capacitor 32, to reach a useable minimum amplitude. This amplitude 72 is illustrated in FIG. 3 and is on the order of two hundred microvolts.

Typical valued for the circuit of FIG. 1, in addition to the plus and minus 2 volts, are the impedance means 60 equal to 100,000 ohms and the stray capacitance 32 on the order of 10 picofarads. Therefore, the time constant $t_1$ is approximately 1 microsecond. Since as heretofore indicated, the minimum amplitude is approximately 200 microvolts, the voltage must decay by four orders of magnitude. For each time constant, the voltage decays by 63 percent or is reduced to 37 percent of its starting value. Therefore, in order for the voltage to decay four orders of magnitude, the number of time constants necessary is equivalent to the power to which the number 0.37 must be raised to equal 0.0001. The power is approximately nine, therefore $T_1$ is nine times $t_1$ or approximately nine microseconds.

From the above illustrations, the information contained in the cell 66 would not be available until 9 microseconds after the selection by the selection means 45. In the present state of the art high speed memories, this time is substantially and undesirably long.

In the operation of each cell 22, as illustrated, the voltage on the substrate 40 is at a potential which is greater than zero and typically plus five volts. With the select switch 44 normally closed as illustrated, the minus two volts from terminal 52 forward biases the first emitter 41. Any conduction of the transistor 34 will be from the substrate 40 through the collector 38 and the first emitter 41 to the supply 52. If the cell is selected by transferring the switch 44 to its mornally open contact 54, the first emitter 41 is back-biased by the plus 2 volts from the terminal 58. Depending upon the amount of radiant energy falling on the base 36, the second emitter will be forward biased and current will conduct from the substrate through the impedance means 60 to ground 70. As previously indicated, this current is very small.

Figures 4, 5:
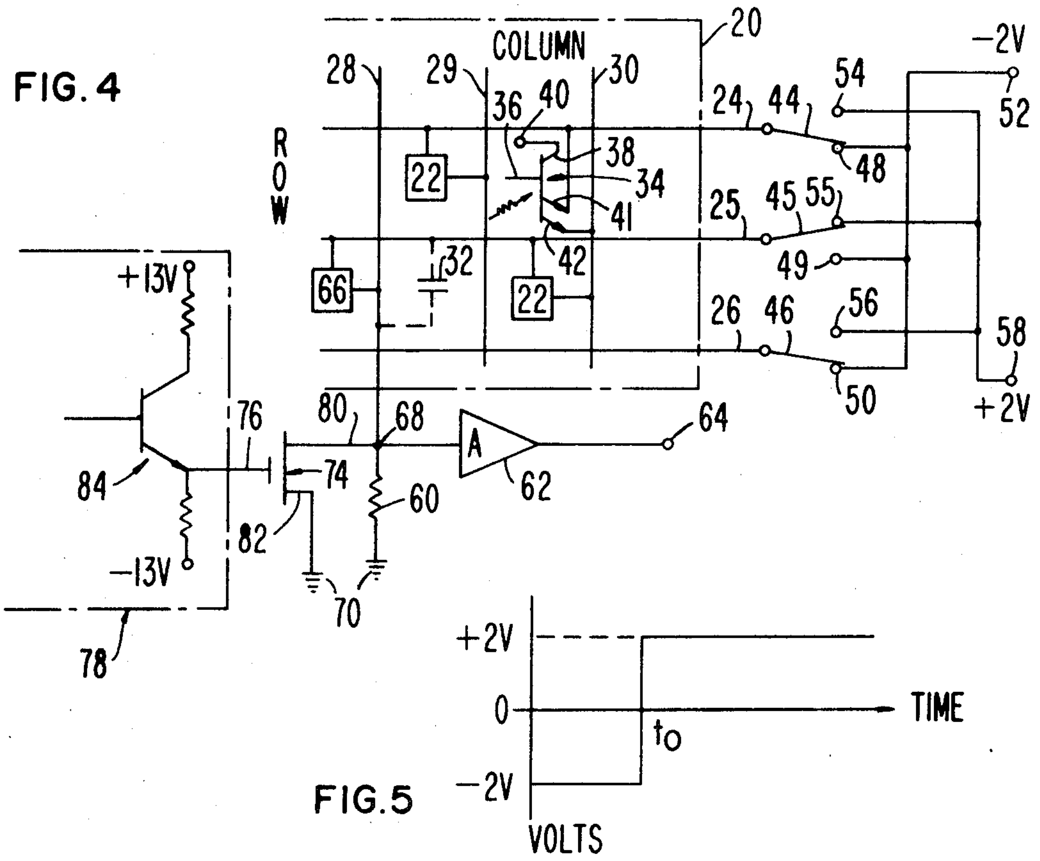
FIG. 4 is a modification of the memory array sense amplifier system of FIG. 1.
FIG. 5 is a voltage wave form illustrating the activation of one of the switches of FIG. 4.

Referring to FIG. 4, there is illustrated a first modification of the circuit of FIG. 1. Acknowledging the fact that the voltage at the junction 68 requires in excess of eight time constants to go below the predetermined minimum value 72 upon cell energization, either one of two variables must be changed. These variables are, namely the resistance of the impedance means 60 or the capacitance of the interelectrode capacitance 32. Since the interelectrode capacitance 32 is a function of the array and the device in the array, the only component which may be easily altered is the resistance value of the impedance 60. As illustrated in FIG. 4, an electronic impedance means 74 is electrically inserted in parallel with the impedance means 60. The electronic impedance means 74 may be a metal oxide semiconductor, (MOS) transistor or field-effect transistor wherein the gate electrode 76 is controlled by a control circuit 78. The drain electrode 80 is electrically connected to the junction 68. The source electrode 82 is electrically connected to ground 70. The effective resistance of the electronic impedance 74 when it is in the state of conduction as controlled by the control circuit 78, is approximately one thousand ohms. When this impedance is placed in parallel circuit with the impedance means 60, the effective resistance between the junction 68 and ground 70 is approximately 1,000 ohms. This will effectively reduce the time constant by two orders of magnitude which also reduces the overall time to $T_2$ which is two order of magnitude less than $T_1$.

The control circuit 78 comprises an emitter follower circuit wherein the control signal is applied to the base electrode of the transistor 84. The method of operation of the circuit of FIG. 4 is to turn the control circuit off, thereby placing the electronic impedance 74 in parallel with the impedance 60 just prior to the selection of a cell 66 of the array 20.

Figure 6:
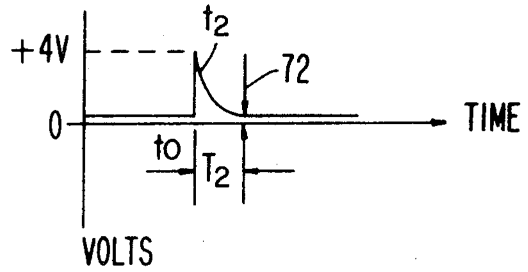
FIG. 6 is a voltage wave form illustrating the output voltage of the array of FIG. 4.

FIG. 5 which is similar to FIG. 2 shows the selection of a row or select electrode 24–26 at time $t_O$. FIG. 6 is likewise similar to FIG. 3 as it is the voltage at the junction point 68. As illustrated in FIG. 6, when a given cell is selected there appears at the junction 68 a transient voltage due to the capacitance 32 being charged. However, the voltage in FIG. 6 has time constant $t_2$ which by using the values of the example above has a time constant two orders of magnitude less than the time constant $t_1$. Therefore, the overall time $T_2$ is two orders of magnitude less than the overall time $T_1$.

Figure 7:
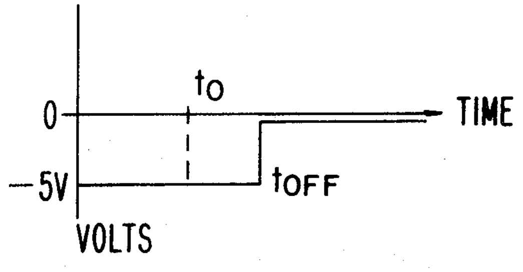
FIG. 7 is a wave form diagram illustrating the conduction of the control circuit of FIG. 4.
Figure 8:
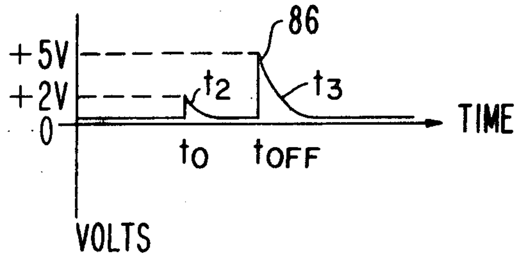
FIG. 8 is a voltage wave form illustrating the output voltage of the array of FIG. 4 including the time when the control circuit is turned off.

FIG. 7 is a voltage wave form which may be found at the emitter of the transistor 84. At $t_O$ the transistor is non-conducting and therefore the electronic impedance 74 is in conduction. At $t_{off}$ the transistor 84 is driven into conduction to turn off the electronic impedance 74. It is necessary to turn off the electronic impedance 74 to provide a high output impedance on the sense column. This is required because the output current of the memory cell in the array is very small. However, as indicated in FIG. 8 when the electronic impedance 74 is driven out of conduction, a second transient 86 is generated having a maximum voltage amplitude of approximately 5 volts which is the voltage change across the gate-drain electrodes of the impedance 74. The time constant $t_3$ of this wave shape is equal to the resistance of the impedance 60 multiplied by the capacitance of the gate-drain capacitance of the electronic impedance. Even though the gate-drain capacitance is extremely small value, the transient generated is substantial as compared to the output pulse of the cell. In order to effectively utilize the circuit of FIG. 4, the voltage at the output terminal 64 would not be useable until some time following the turn off of the control transistor 84.

Figures 9, 10:
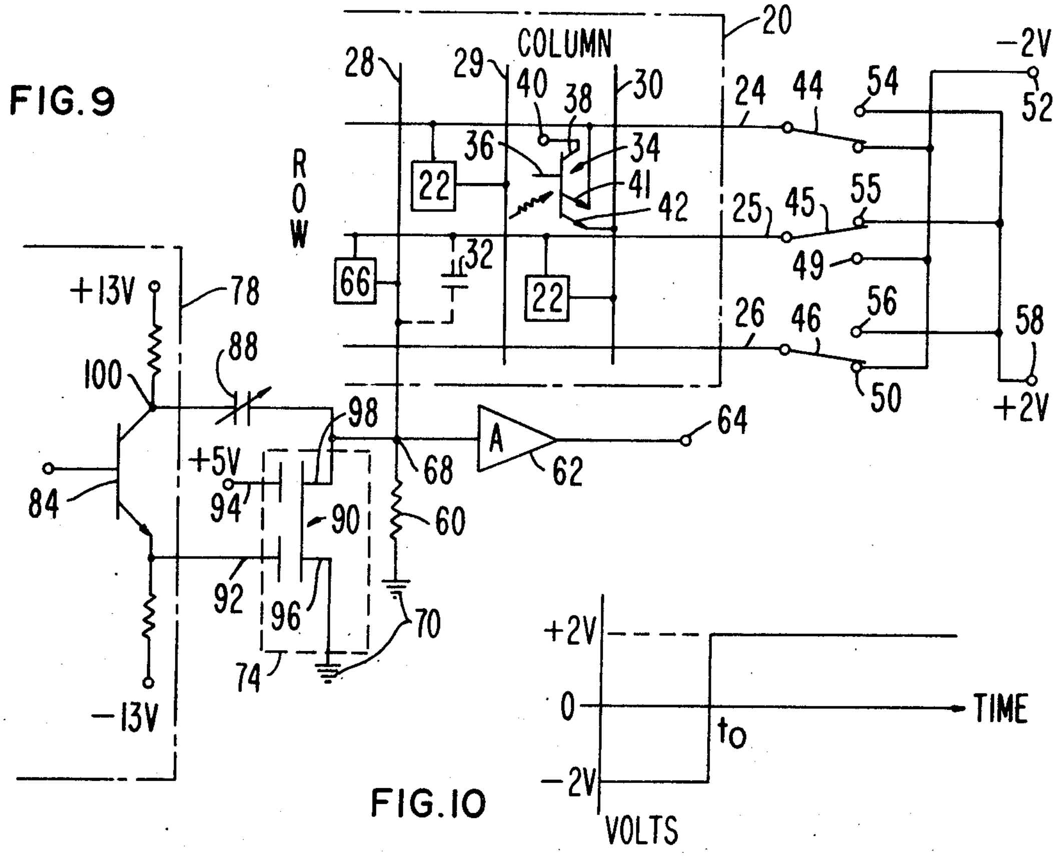
FIG. 9 is a second modification of the memory array sense amplifier system of FIG. 1.
FIG. 10 is a voltage wave form illustrating the activation of one of the switches of FIG. 9.

The circuit of FIG. 9 illustrates a further improvement over the circuit of FIG. 4. The improvement comprises the addition of a balancing capacitor 88 and the use of a dual gate MOS field-effect transistor 90 for the electronic impedance 74. The first gate electrode 92 is connected to the emitter of the control circuit transistor 84. The second gate electrode 94 of the electronic impedance 74 is electrically connected to a supply voltage of plus 5 volts. The source electrode 96 is connected to ground 70. The drain 98 is electrically connected to the junction 68 and to one side of the balancing capacitor 88. The other side of the balancing capacitor 88 is electrically connected to the collector 100 of the control transistor, which here acts as a phase splitting amplifier. It is a function of the balancing capacitor 88 to supply a voltage signal which will counteract or cancel the transient signal generated when the electronic impedance 74 is driven out of conduction. The capacitance is adjusted to provide the charge necessary to effectively cancel this turn off transient.

A dual gate MOS field-effect transistor was selected because the gate to drain capacitance is approximately one hundredth of the gate to drain capacitance of a single gate unit. This allows the value of the balancing capacitor 88 to be small. However, if component size is not a requirement, the circuit of FIG. 4 could be modified by adding a balancing capacitor between the collector of the control transistor 84 and the drain 80 of the electronic impedance 74.

Figure 11:
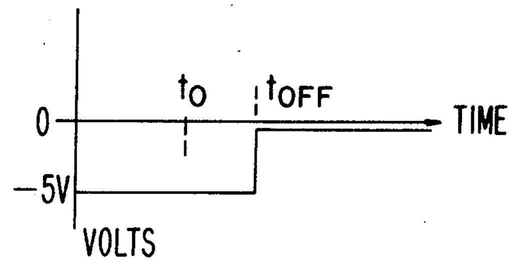
FIG. 11 is a wave form diagram illustrating the conduction of the control circuit of FIG. 9.
Figure 12:
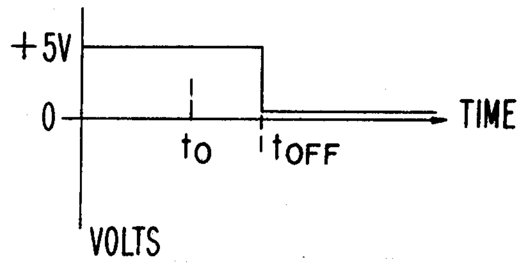
FIG. 12 is a voltage wave form at the control circuit side of the balancing capacitor of FIG. 9.
Figure 13:
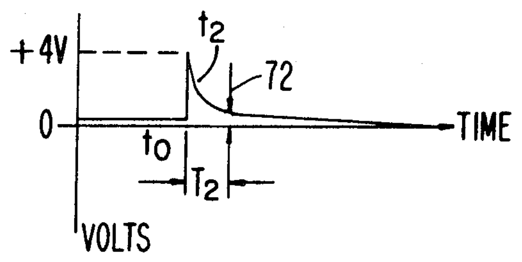
FIG. 13 is a voltage wave form illustrating the output voltage of the array of FIG. 9 including the time when the control circuit is turned off.

FIGS. 10, 11, 12 and 13 are the wave shape diagrams for the circuit of FIG. 9. FIG. 10 similar to FIGS. 2 and 5 and illustrates the selection of a given select electrode of the array. FIG. 11 illustrates the conduction of the electronic impedance means 74 by showing the voltage wave shape that may be found at the drain electrode 96. FIG. 12 which is basically electrically opposite to FIG. 11, illustrates the voltage wave shape at the collector 100 of the control transistor 84. When the control transistor 84 is turned on at $t_{off}$ the voltage at the collector drops from a plus 5 volts to substantially zero volts. If the electronic impedance 74 were not connected in the circuit, then the voltage at the junction 68 when the control transistor 84 is turned off would be electrically opposite to the second wave shape 86 of FIG. 8. Since this wave shape is substantially identical but opposite to the wave shape 86, the only wave shape that appears at junction 68 is the voltage wave shape illustrated in FIG. 13 wherein only the initial turn off transient at $t_0$ is seen.

There has thus been shown and described a sense amplifier for use with an array of two-state devices. Each device in the array is capable of being selectively addressed or accessed by an energizing conductor and a responding conductor. The sense amplifier has an impedance means electrically connected in series circuit with the responding conductor. This impedance means develops a signal in response to the current emitted by the device in the array and flowing in the responding conductor. A high gain amplifier is electrically connected to respond to the signal developed by the impedance for use in an utilization circuit.

Electrically connected in parallel circuit with the impedance means is an electronic impedance. This electronic impedance controllably reduces the effective value of the impedance means. This reduction in value reduces the time constant of a circuit comprising the impedance in series the stray capacitance found between the energizing and responding conductors of the array. By reducing the time constant, the transient pulse time due to the charging of this capacitance is reduced.

A control means is electrically coupled to the electronic impedance for controlling the operation thereof. The control means functions by inserting the electronic impedance in parallel with the impedance means when the array device is selected. Additionally the control means functions to remove the electronic impedance when the array device is interrogated which is a predetermined period of time after insertion.

A transient that is generated upon turn-off of the electronic impedance is effectively cancelled by a charge on a balancing capacitor which is electrically connected between the control means and the high-gain amplifiers. The charge on this capacitor nulifies the transient generated by the turn off of the electronic impedance.

What is claimed is:

1. In an electronic matrix memory cell system wherein a bit of information in a cell is selectively addressed by an energizing conductor and a responding conductor, a sense amplifier comprising:

impedance means electrically connected in circuit with the responding conductor for developing an electrical signal in response to the current from the cell in the responding conductor;

output means responsive to the electrical signal developed by said impedance means for generating an increased signal;

electronic impedance means electrically connected in parallel with said impedance means for controllably reducing the effective impedance connected in circuit with the responding conductor thereby reducing the transient pulse time due to the interelectrode capacitance between the energizing conductor and the responding conductor; and control means electrically coupled to said electronic impedance means for controlling the operation thereof by electrically inserting said electronic impedance in parallel with said impedance means when the memory cell is addressed and electrically removing said electronic impedance means from said circuit when the transient pulse has decayed below a permissible level for activating said output means.

2. The sense amplifier according to claim 1 wherein said output means is a high gain amplifier for generating an increased voltage signal in response to the signal developed in said impedance means.

3. The sense amplifier according to claim 1 wherein said electronic impedance means is a field-effect transistor electrically connected in circuit as a resistor.

4. The sense amplifier according to claim 3 wherein the effective resistance value of said field-effect transistor during conduction is very substantially less than the resistance value of said impedance means.

5. The sense amplifier according to claim 3 wherein said control means is a transistorized switch having its output electrode electrically connected to the drain electrode of said transistor and responsive to an electrical signal applied to its base electrode for controlling the conduction of said transistor.

6. In an electronic matrix memory cell system wherein a bit of information in a cell is selectively addressed by an energizing conductor and a responding conductor, a sense amplifier comprising:

impedance means electrically connected in circuit with the responding conductor for developing an electrical signal in response to the current in the responding conductor;

output means responsive to the electrical signal developed by said impedance means for generating an increased signal;

electronic impedance means electrically connected in parallel with said impedance means for controllably reducing the effective impedance connected in circuit with the responding conductor thereby reducing the transient pulse time due to the interelectrode capacitance between the energizing conductor and the responding conductor;

control means electrically coupled to said electronic impedance means for controlling the operation thereof by inserting said electronic impedance in parallel with said impedance means when the memory cell is addressed and removing said electronic impedance means from said circuit when the transient pulse has decayed below a permissible level for activating said output means; and capacitance means electrically connected in circuit between said electronic impedance and said control means, said capacitance means responsive to said control means when removing said electronic impedance for generating a transient signal of opposite polarity to the transient signal generated by the removal of said electronic impedance means for reducing said last named transient signal to a mullity.

7. The sense amplifier according to claim 6 wherein said electronic impedance means is a dual gate field-effect transistor, wherein said capacitance means and one end of said impedance means are electrically connected to the drain electrode, the opposite end of said impedance means is electrically connected to the source electrode, and said control means is electrically connected to the first gate electrode.

8. The sense amplifier according to claim 7 wherein said control means is a transistor electrically connected in a grounded emitter configuration wherein said emitter lead is electrically connected in circuit to the first gate electrode of said field-effect transistor and the collector lead is electrically connected to through said capacitance to the drain electrode of said field-effect transistor, said transistor is driven into conduction by a signal on its base lead for causing said field-effect transistor to go into conduction and said transistor is driven out of conduction after a predetermined period of time for coupling a signal from its collector lead to the drain electrode to reduce the turn off transient of said field-effect transistor due to the interlectrode capacitance between the first gate and the drain electrode of said field-effect transistor.

9. A memory system comprising:

an array of binary information cells, each cell addressable by a row electrode electrically connected to the input of said cell and a column electrode electrically connected to the output of said cell, said electrodes being capacitively coupled to each other;

selection means electrically connected to each row electrode respectively for selecting a predetermined row of cells in said array;

a first impedance electrically connected to each column electrode respectively and responsive to the current generated by the binary state of a cell energized by said selection means for developing an electrical signal indicating the binary value of said energized cell;

said first impedance means electrically connected in series with the capacitive coupling between the energized row electrode and the column electrode;

an electronic impedance means electrically connected in a parallel with said first impedance for controllaby reducing the effective impedance connected in electrical series with the capacitive coupling between the energized row electrode and the column electrode; and control means electrically connected to said electronic impedance means for controlling the operation thereof by electrically inserting said electronic impedance means in parallel with said first impedance means when said selection means initially selects a row electrode for reducing the transient charging time of the capacitance due to said capacitive coupling and for electrically removing said impedance a predetermined interval after insertion thereof.

10. The memory system according to claim 9 wherein said array in an array of light activated cells responsive to a source of radiant energy to generate a binary one value and to the absence of said source to generate a binary zero value.

11. The memory system according to claim 9 wherein said electronic impedance means is an field-effect transistor having its drain electrode electrically connected between said first impedance means and said column electrode, its gate electrode electrically connected to said control means and its source electrode electrically connected to opposite end of said first impedance means.

12. The memory system according to claim 11 wherein said control means is a transistorized switch wherein said emitter electrode is electrically connected to the gate electrode of said transistor and electrically connected in circuit to a voltage source, said switch controllable through its base electrode for controlling the conduction of said transistor.

13. The memory system according to claim 12 further including a capacitor electrically coupled between the collector electrode of said control means and the drain electrode of said electronic impedance means and responsive to the turn-on of said control means.

14. A memory system comprising:

an array of binary information cells, each cell addressable by a row electrode electrically connected to the input of said cell and a column electrode electrically connected to the output of said cell, said electrodes are capacitively coupled to each other;

selection means electrically connected to each row electrode respectively for selecting a predetermined row of cells in said array;

a resistor electrically connected to each column electrode respectively and responsibe to the current generated by the binary state of a cell energized by said selection means for generating an electrical signal indicating the binary value of said energized cells;

said resistor electrically connected in series circuit with the interelectrode capacitance between the energized row electrode and the column electrode;

a dual gate field-effect transistor electrically functioning as a resistance wherein the second gate electrode is connected to a voltage supply, the drain electrode is electrically connected between said field-effect transistor and the column electrode, the source electrode is electrically connected in circuit to the other end of said field-effect transistor for controllably reducing the effective resistance connected in electrical series with said interelectrode capacitance;

a transistorized switch having its output lead electrically connected to the first gate lead of said field-effect transistor and connected to a voltage source and being controlled by an electrical signal applied to its base lead for causing said field-effect transistor to be driven into conduction to reduce its effective resistance thereby reducing the transient time constant associated with the interelectrode capacitance between the selected row electrode and the column electrode when said selection means is activated; and capacitive means electrically connected between the input lead of said switch and the drain electrode of said field-effect transistor for electrically diminishing the transient pulse generated in said field-effect transistor due to the first gate to drain interelectrode capacitance and applied to said resistor when said field-effect transistor is driven out of conduction by said transistorized switch.

* * * * *